United States Patent [19]

Ferris et al.

[11] Patent Number: 4,569,629
[45] Date of Patent: Feb. 11, 1986

[54] HELICOPTER GIMBAL ROTOR

[75] Inventors: Donald L. Ferris, Newton; Charles F. Niebanck, Stratford; Thomas G. Campbell, Cheshire; Eric G. Olsen, Woodbury, all of Conn.

[73] Assignee: United Technologies Corporation, Hartford, Conn.

[21] Appl. No.: 655,384

[22] Filed: Sep. 27, 1984

[51] Int. Cl.[4] .................................... B64C 27/33
[52] U.S. Cl. ............................ 416/134 A; 416/140
[58] Field of Search ............ 416/138 A, 134 A, 102, 416/148, 140 A

[56] References Cited

U.S. PATENT DOCUMENTS

| 2,606,621 | 8/1952 | Neale | 416/148 X |
| 2,633,925 | 4/1953 | Bates | 416/102 |
| 2,648,387 | 8/1953 | Doman | 416/134 A X |
| 2,861,641 | 11/1958 | Bensen | 416/148 |
| 3,288,226 | 11/1966 | Lemont et al. | 416/140 A X |
| 3,412,680 | 11/1968 | Girard | 416/148 X |
| 4,111,605 | 9/1978 | Roman et al. | 416/141 |
| 4,115,031 | 9/1978 | Drees et al. | 416/134 A |
| 4,323,332 | 4/1982 | Fradenburgh | 416/134 A |
| 4,326,834 | 4/1982 | Ostrowski | 416/134 A |
| 4,477,225 | 10/1984 | Burkam | 416/134 A |

FOREIGN PATENT DOCUMENTS

| 726828 | 6/1932 | France | 416/140 A |
| 811394 | 4/1937 | France | 416/245 C |
| 972677 | 8/1950 | France | 416/245 C |
| 296514 | 5/1932 | Italy | 416/140 A |
| 363642 | 2/1939 | Italy | 464/89 |

Primary Examiner—Everette A. Powell, Jr.
Attorney, Agent, or Firm—Gerald E. Linden

[57] ABSTRACT

Hub moment and driving torque is provided for a helicopter gimbal rotor by two-part flat springs that are in-plane with the rotor tilt point (P). The inboard end of an outward part of each spring is connected to the rotorshaft and the inboard end of an inward part of the spring is connected to the tiltable hub member. The outboard ends of the two spring parts are journaled together by an eccentric elastomeric joint that allows for spring foreshortening that accompanies rotor tilt.

1 Claim, 8 Drawing Figures

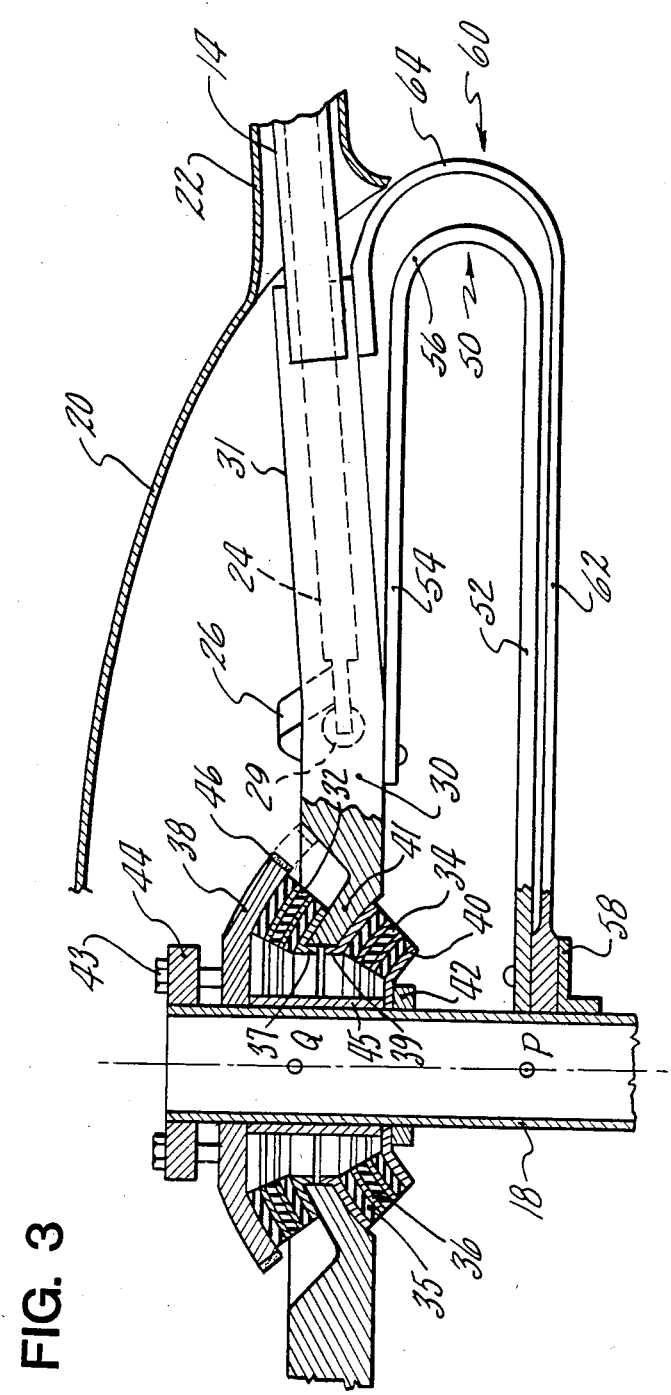
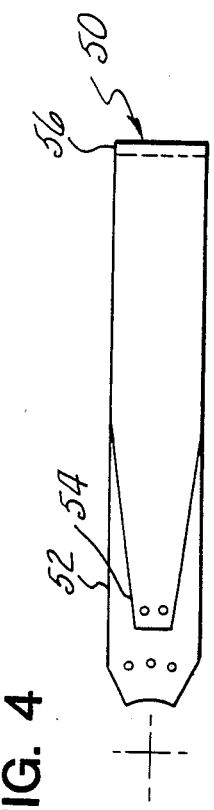
FIG. 3
FIG. 4

FIG. 7
FIG. 8
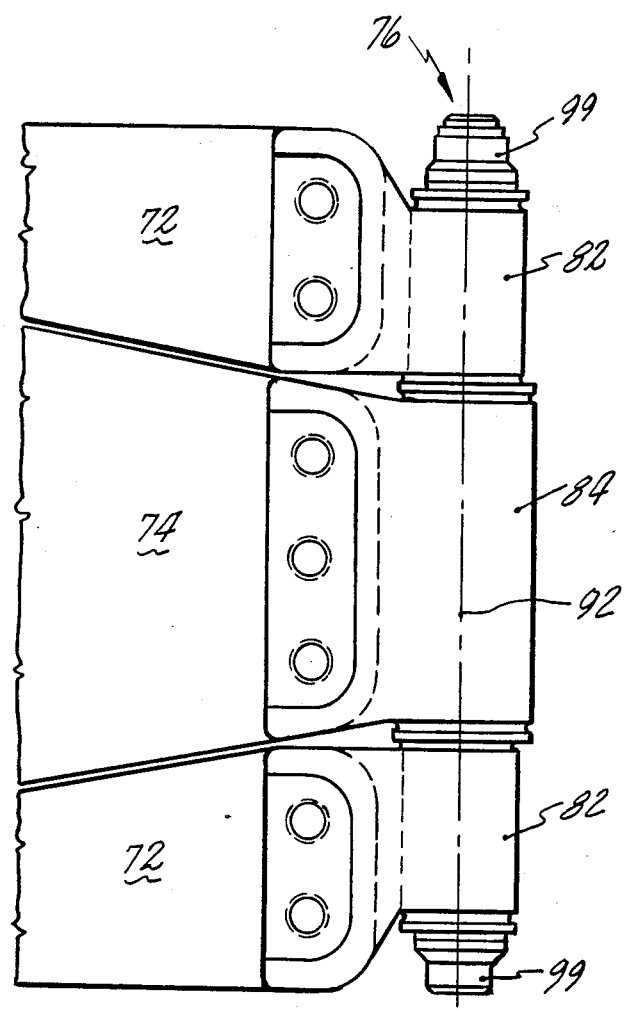
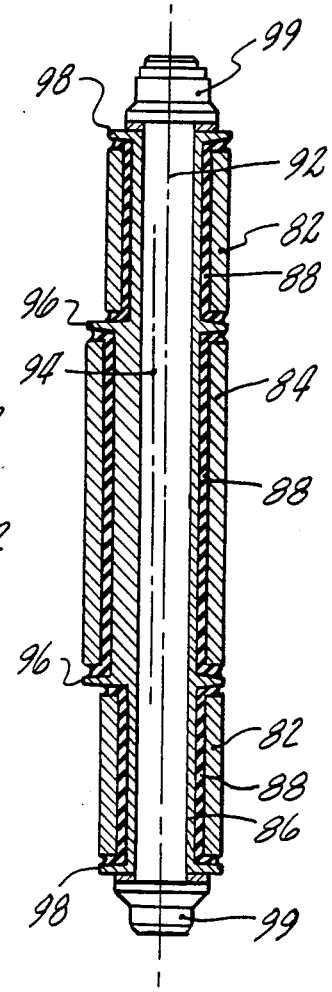

HELICOPTER GIMBAL ROTOR

The government has rights in this invention pursuant to Contract No. DAAK51-83-C-0010 awarded by the Department of the Army.

CROSS REFERENCE TO RELATED APPLICATIONS

Cross reference is made herein to copending, commonly-owned U.S. patent application Ser. No. 655,386, filed Sept. 27, 1987, entitled HELICOPTER GIMBAL ROTOR, filed on even date herewith by Miller and U.S. patent application Ser. No. 655,385, filed Sept. 27, 1984, entitled HELICOPTER GIMBAL ROTOR, filed on even date herewith by Miller.

BACKGROUND OF THE INVENTION

A gimballed rotor hub tilts with respect to the rotorshaft to accommodate blade flapping, and is discussed generally in U.S. Pat. No. 4,323,332 (Fradenburgh, 1982), entitled HINGELESS HELICOPTER ROTOR WITH ELASTIC GIMBAL HUB. Typically, discrete components are used to allow for tilt, to drive torque, and to provide a flapping moment. For instance, U.S. Pat. No. 3,007,654 (Doman, 1961), entitled ROTOR AND BLADE FOR ROTORCRAFT, discloses a universal joint (21) for allowing tilt; U.S. Pat. No. 3,080,002 (DuPont, 1963), entitled ROTOR WITH FIXED PYLON, discloses a torque rigid boot (36) for driving torque; and U.S. Pat. No. 4,073,600 (Doman, 1978), entitled DAMPING MECHANISM FOR THE ROTOR HUB OF A HELICOPTER FOR GROUND RESONANCE AND WADDLE AND ITS COMBINATION WITH THE ROTOR, discloses a fluid damper (35, 36) for providing a hub moment.

DISCLOSURE OF THE INVENTION

According to the invention, a hub member is pivotally attached to the rotorshaft of a helicopter and tilts about a point (P) below the rotor plane. Flat two-piece springs are provided in-plane with the tilt point (P) to react hub moment by bending and to drive torque by edgewise stiffness one extends outwardly from an attachment point on the rotorshaft and the other piece extends inwardly for attachment to the tiltable hub member via a spacer. The outboard ends of the two spring pieces of each spring are journaled together by an eccentric elastomeric joint that allows for foreshortening, or lengthwise translation of one piece relative to the other, that necessarily accompanies spring bending.

Other objects, features and advantages of the invention will become more apparent in light of the following description thereof.

BRIEF DESCRIPTION OF THE DRAWINGS

FIG. 3 is side cross-sectional view of the rotor system;

FIG. 4 is a top view detailing a spring for the rotor system;

FIGS. 7 and 8 are detailed top and end views, respectively, of the spring of FIG. 6.

BEST MODE FOR CARRYING OUT THE INVENTION

Figure 1:
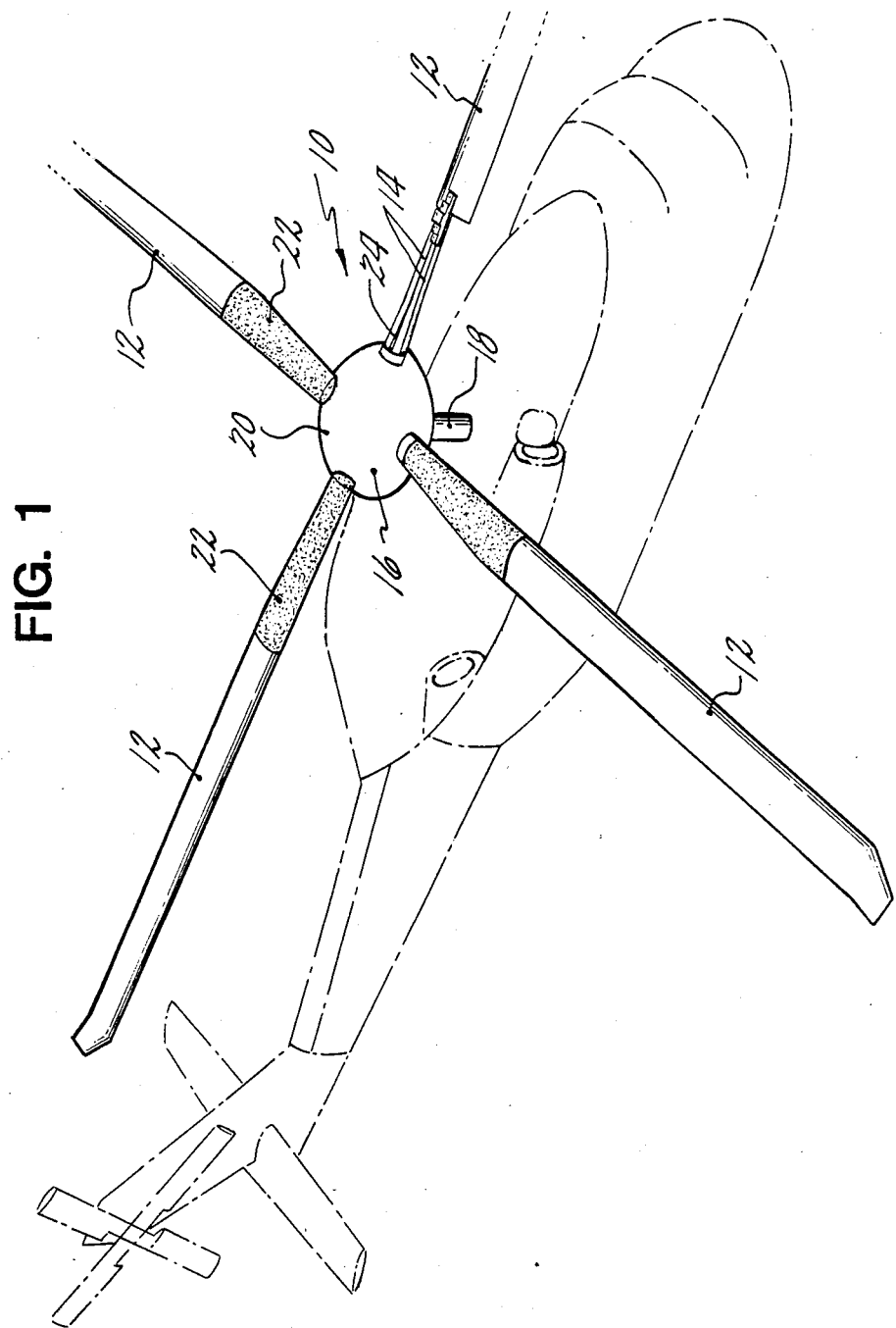
FIG. 1 is a perspective view of a helicopter having a rotor system that utilizes the invention.

FIG. 1 shows a rotor system 10 for a helicopter (shown in phantom) having four blades 12 attached via flexbeams 14 and a hub 16 to a rotorshaft 18 that is driven by an engine and transmission (not shown). The hub 16 is enclosed by an aerodynamic fairing 20. The flexbeams 14 are enclosed by aerodynamic fairings 22 (one removed to expose the flexbeams), which are described in copending, commonly-owned U.S. patent application Ser. No. 610,373, entitled AN AERODYNAMIC FLEXIBLE FAIRING, and filed on May 15, 1984 by G. Miller.

Figure 2:
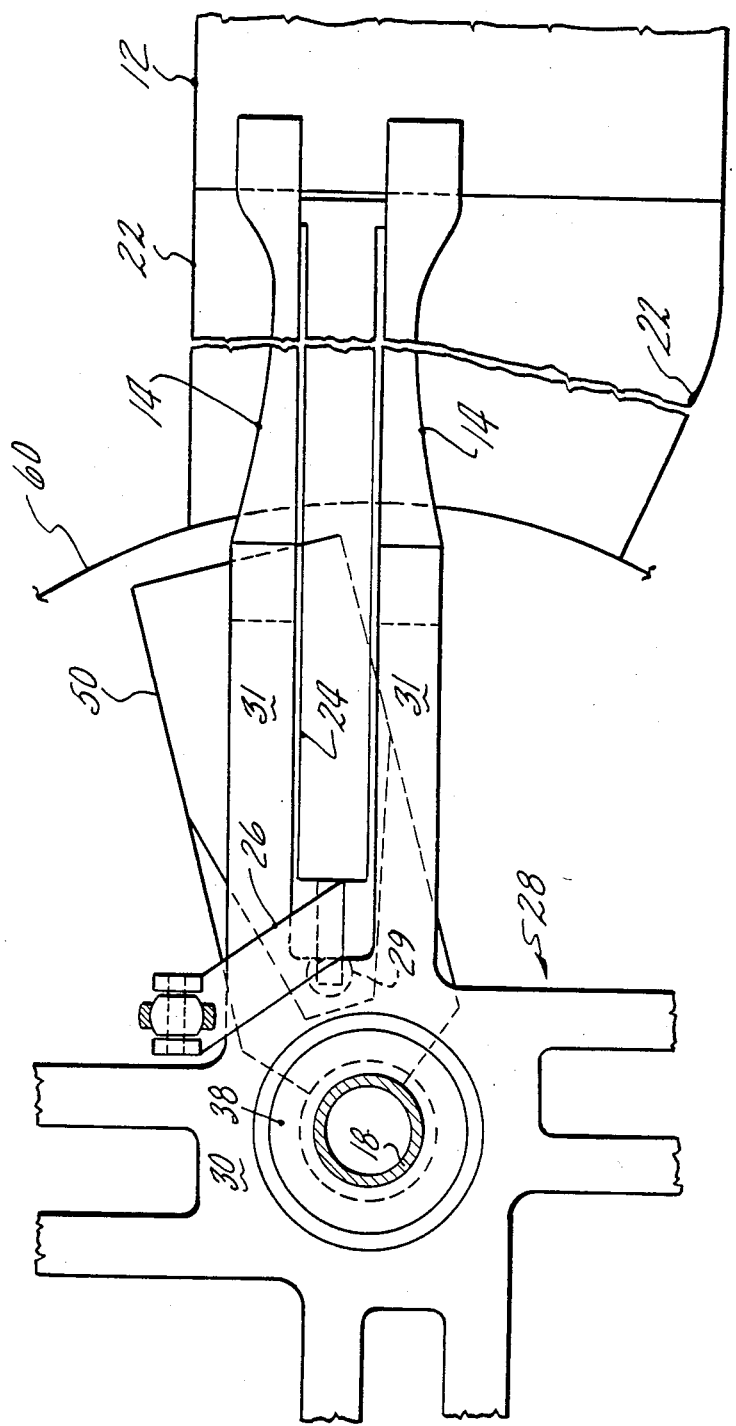
FIG. 2 is a top view of the rotor system.

FIGS. 2 and 3 are detailed top and side views of the rotor system 10. Throughout this description, similarly numbered elements in different figures correspond.

Each blade 12 is attached at its root end to a pair of flexbeams 14. The flexbeams and associated blade are slightly offset from radial with respect to the rotorshaft 18 so that the blades are prelagged. The attachment of one blade is discussed and shown in detail as representative of all. The flexbeams are parallel and spaced-apart to accommodate a torqueshaft 24 therebetween. The torqueshaft 24 is attached to the outboard end of the flexbeams 14 at the root end of the blade 12 and relays cyclic and collective pitch changes to the blade 12 from a pitch horn 26 in response to attitude control inputs from a pilot or automatic control system (not shown). Therefore, the flexbeams 14 are torsionally compliant to accommodate blade pitch changes. A suitable flexbeam is described in copending, commonly-owned U.S. patent application Ser. No. 610,370, entitled A COMPOSITE FLEXBEAM FOR A ROTARY WING AIRCRAFT, and filed on May 15, 1984 by Fradenburgh, et al. Edgewise and flapwise the flexbeams 14 are relatively stiff to restrain those modes of blade motion.

The flexbeams 14 are attached at their inboard ends to a hub member 28. The hub member 28 has a ring-like portion 30, which is concentric with the rotorshaft 18, for pivoting thereabout in a manner described hereinafter, and generally radial arms 31 that are in-line with and attach to the flexbeams 14. The hub member 28 is very still to react and net-out blade centrifugal forces.

The torqueshaft 24 resides between the arms 31 and is journaled to the ring 30 by a teflon-lined bearing 29 which is nestled in a recess in the outer edge of the ring 30. This allows for torqueshaft rotation, as well as a small degree of motion in response to blade edgewise and flapwise motion.

Disregarding a slight amount of preconing, the blades 12, flexbeams 14, torqueshafts 24, and hub member 28 all lie essentially in a rotor plane that intersects the rotorshaft axis at a point (Q). Or, the point (Q) can be thought of as the rotor center of gravity.

DUAL GIMBAL BEARINGS

The hub member 28 is mounted in a pivotable manner to the rotorshaft 18 between two spherical bearings, an upper bearings 32 and a lower bearing 34, which may be characterized as two elements of one bearing. The bearings 32 and 34 are spherical, laminated elastomeric bearings having alternate layers of elastomer 35 and nonresilient shims 36 which are well-known and disclosed, for instance, in U.S. Pat. No. 4,203,708 (Rybicki, 1980). However, whereas in Rybicki the bearing (18) reacts centrifugal, lead/lag, flap, and pitch, the bearings 32 and 34 of the present invention react flap and lift and are designed for both positive and negative lift reaction with equal stiffness in both. The number of elastomer layers is not limited to the number shown.

The bearings 32 and 34 are concentric, having coincident centers at a point (P) on the rotorshaft axis. However, they do not intercept the same angle with respect to the axis. Instead, the upper element 32 is moved closer-in to the axis to reduce the envelope and to provide bearing stability under large tilt motions.

The upper bearing 32 has an inner (toward the hub member 28) annular race 37 and an outer annular race 38. Similarly, the lower bearing 34 has an inner (toward the hub member 28) annular race 39 and an outer annular race 40. The inner edge of the hub member 28 has an annular flange 41 that is clamped between the bearings 32 and 34 in the following manner.

The lower bearing 34 is slidable downward over the rotorshaft 18 to its ultimate position (as shown in FIG. 3) where the outer race 40 is restrained against further downward movement by a shoulder 42 on the rotorshaft. The flange 41 engages the inner race 39 of the lower bearing 34 which has a vertical upwardly-projecting annular lip that locates the inside edge of the flange 41. The upper bearing 32 is also slidable downward over the rotorshaft 18 so that the inner race 37 engages the flange 41. The inner race 37 has a vertical downwardly-projecting annular lip that aligns with the lip on the race 39 and similarly engages the inside edge of the flange 41. A clamping arrangement, such as bolts 43 and a mast nut 44 that engages the rotorshaft 18, is suited to apply a downward force to the outer race 38 to securely clamp the flange 41 between the inner races 37 and 39 so that the hub member 28 and, ultimately, the rotor system tilts in concert with the bearings 32 and 34 about the point (P). The clamping force is also desirable for precompressing the elastomer laminates which, as is commonly known, will increase bearing life by ensuring that any tension results in net compression. A spacer 45 between the outer races 38 and 40 insures that the elements 32 and 34 are not over-compressed.

The rotor system tilts about the point (P) which is offset beneath the rotor plane, or point (Q). This results in an "overslung" rotor system that requires less rotorshaft length and which produces less shaft movement than a comparable "underslung" system. It should be understood that the point (Q) moved up and down, slightly, on the rotorshaft axis as the rotor tilts and is shown for a nominal, no-tilt position.

A tilt stop limits the gimbal tilt angle. The outer edge of the race 38 is angled to be focused at the point (P). Similarly the base of the flange 41 is angled towards the point (P). At extreme tilt angles, such as seven degrees, the race 38 rollingly contacts the flange 41. This is best viewed in the context of a soft pad 46 which is applied to the race 38 and which is shown in phantom for the extreme tilt angle.

In the initial sizing of elastomeric bearings for design trade-off studies, the analytical techniques involve simple methods based upon conventional strength of material approaches. Average pressures and strains are calculated using handbook formulas and average elastomer criteria for shape factor and modulus. Empirical formulas, based on gross assumptions of bearing construction, are available to establish initial overall size. Bearing stiffness can be calculated, using handbook techniques, to determine compatibility with the specific application.

After the bearing's external envelope is defined in this manner, specific details of the laminate package can then be defined. Shim thickness and elastomer laminate thickness and modulus can be selected on the basis of balanced elastomer strains and/or stiffness, and by shim bending stresses. Simplified geometry and idealized loading assumptions are required at this stage of the analysis for purposes of design iteration. Bearing loads and/or motions must be applied individually and added vectorially or stresses must be superposed to establish a basic understanding of the combined shim or elastomer stresses. This methodology does not account for the nonlinear stress-strain behavior of the elastomer, nor for the nonlinearities involved in the analysis of any large strain problem. In addition, many bearings under load have nonaxisymmetric geometries and nonaxisymmetric loadings. Finite element techniques are required to obtain a better understanding of this three-dimensional highly nonlinear analytic problem. Computer codes have been developed, base on programs like TEXGAP and NASTRAN which are capable of handling some of the problems involved in this analysis. They contain elements which are formulated to reflect the incompressible behavior of elastomers (Poissons's ratios near 0.5). The entire bearing can also be modeled. A more accurate definition of the stress/strain within the bearing can be obtained under various combinations of loading. Local and edge effects can be more accurately evaluated. The bearing design can be refined to obtain a better balance of elastomer strains across the bearing and to minimize shim stresses. (*American Helicopter Society Journal*, January 1981, p. 37; The Sikorsky Elastomeric Rotor, R. Rybicki)

HUB MOMENT

In a gimbal rotor system it is necessary to provide a hub moment; in other words, to restrain the hub from freely tilting with respect to the rotorshaft. Otherwise, under certain thrust conditions, the rotor will not control the aircraft attitude. This is known and disclosed, for instance in U.S. Pat. No. 3,804,552 (Covington, 1974), entitled FOUR BLADE MAIN ROTOR CONTROL POWER COUPLING, wherein an elastomeric spring (80) is provided to couple forces from the rotor to the rotorshaft. It is also known to provide a compound elastomeric spring so that for low tilt angles the restraining force is low, and for greater tilt angles it is high. An example is found in U.S. Pat. No. 4,333,728 (Drees, 1982), entitled COMPOUND HUB STRING SYSTEM FOR HELICOPTERS.

In the rotor system of FIGS. 2 and 3, the elements 32 and 34 are too small to provide such of a hub moment, so it is principally supplied by a spring 50. The spring is a long, flat, U-shaped spring having an "outward" leg 52, an "inward" leg 54, and a bight 56, and is also shown in the isolated top view of FIG. 4. The outward leg 52 attaches to the rotorshaft 18 at a point which is radially offset from, but essentially in-plane with the point (P) via a suitable flange 58. The inward leg 54 is attached to the hub member 28 at the ring portion 30.

As the rotor tilts, the spring 50 provides a restraining force by bending. So that the spring 50 exerts equal stiffness in both tension and compression, it can be preloaded to reduce stiffness in one direction. It should be understood that there is preferably one spring per blade.

It should be understood that two other phenomena accompanying spring bending when the rotor tilts, both of which contribute to stiffness. When the rotor tilts about an imaginary tilt axis, which is essentially radial to the rotorshaft, an on-axis spring will twist rather than bend. Thus there is always twisting as well as bending, except at exactly ninety degrees to the tilt axis. Furthermore, when the spring 50 bends, there is a tendency, called "foreshortening", for the spring to either lengthen or shorten in response to the movement of its free end about a point (P) from which the fixed end is offset, in proportion to the offset. Therefore, analysis of these modes is essential to proper spring sizing.

TORQUE

Torque must be transmitted from the engine, via the rotorshaft, to the blades. The elements 32 and 34 are not suited to the task since they would be required to carry the torque in shear. This limitation is discussed in a similar context with regard to copending, commonly-owned U.S. application Ser. No. 622,809, entitled ELASTOMERIC HIGH TORQUE CONSTANT VELOCITY JOINT, and filed on June 30, 1984 by Byrnes, et al. The springs 50 are also limited in their ability to carry torque because of the twisting problem mentioned previously.

In order to carry torque, a disc 60 is provided. The disc 60 has a flat, flexible diaphragm portion 62 with a hole in its center for attachment at its inner edge to the rotorshaft 18 via the flange 58, and a more rigid rim 64 at its outer edge that curves around the spring 50 for attachment to the hub element 28 at the outboard end of the arms 31.

For no tilt, the diaphragm 62 is normal to the rotorshaft and accommodates rotor torque via its edgewise, or in-plane, stiffness. However, when the rotor tilts, the diaphragm 62 is not only bent, but is twisted, as discussed hereinbefore with regard to the the spring 50. Therefore, the disc 60 is sized to maintain its edgewise stiffness to transmit the required torque and acts as a flexible, constant-velocity coupling. To achieve this function most efficiently, it is important that the diaphragm 62 be in-plane with the tilt point (P).

Suitable disc materials are composite materials such as fiberglass, graphite/epoxy, and KEVLAR ®. Because of the disc's resiliency, it biases hub moment which should be accounted for in the selection of the spring 50, and vice-versa. For some applications, it is conceivable that the spring 50 could be disposed of entirely. Thus, it should be understood that the relative contributions to hub moment by the bearings 32 and 34, the spring 50 and the disc 60 need to be considered aggregately, and can be tailored to provide compound hub moments.

IN-PLANE SPRING

Figure 5:
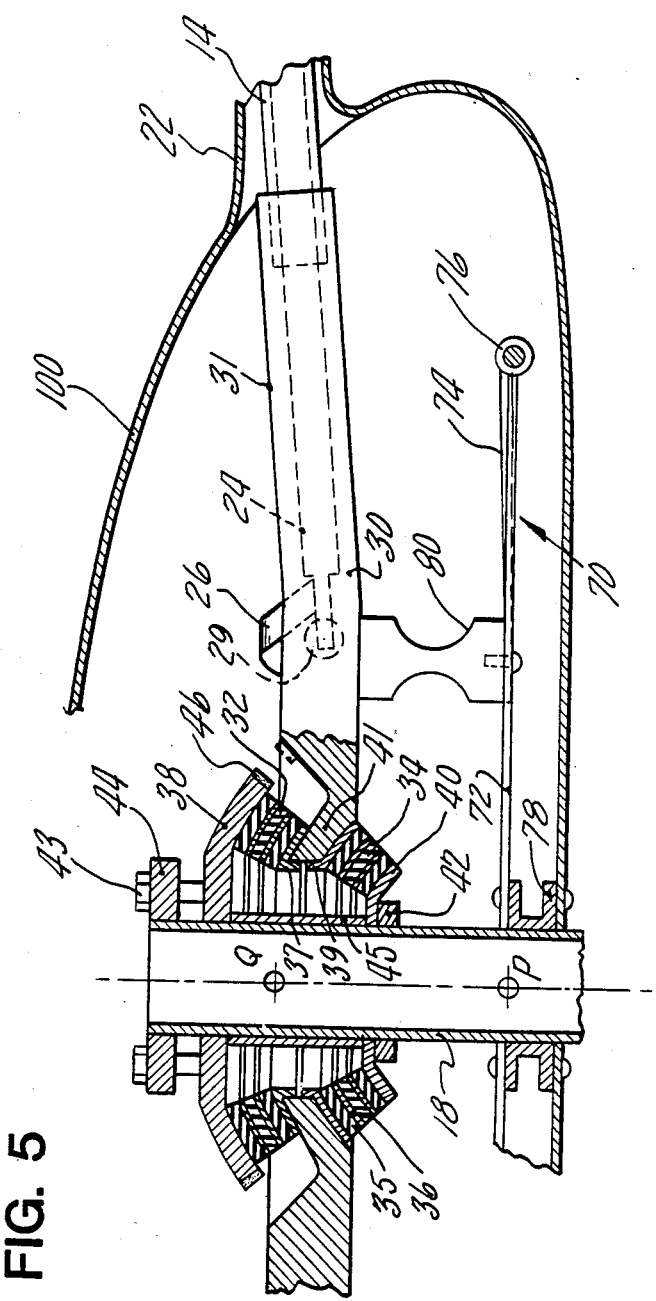
FIG. 5 is a side view of a rotor system that uses a different spring and lower fairing than those shown in FIGS. 1-4.
Figure 6:
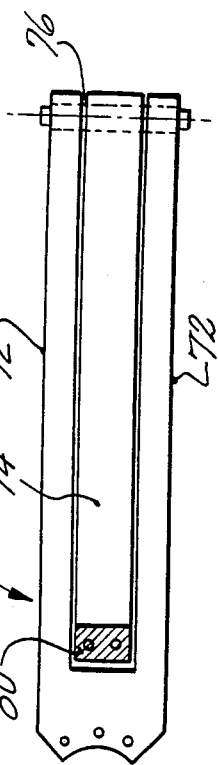
FIG. 6 is top view detailing the different spring of FIG. 5.

In FIG. 5 is shown a rotor system that has the same basic rotorshaft 18, hub member 28, bearings 32 and 34, flexbeams 14, torqueshafts 24 and other similarly numbered elements as the rotor system of FIGS. 1-3. However, instead of using the U-shaped spring 50 and the disc 60, hub moment and torque drive are provided by an in-plane compound spring 70, which is shown in isolated top view in FIG. 6.

The spring 70 is two flat straight springs; an "outward" spring 72 and "inward" spring 74. The springs are journaled together at their outboard ends by a joint 76 which is shown in more detail in the top view of FIG. 7 and the end view of FIG. 8. The spring 72 has a notch extending most of its length from its outboard end to accommodate the shorter spring 74 between the two "legs" formed thereby in a normally in-plane position.

The spring 72 is attached at its inboard end at a point radially offset from but in-plane with the tilt point (P), to a suitable flange 78 on the rotorshaft. The spring 74 is attached at its inboard end at a point radially offset from but in-plane with the tilt point (P), via a suitable spacer 80, to the hub member 28. As the rotor tilts, the spring bends and/or twists to provide a hub moment, in a manner similar to the U-shaped spring 50.

As discussed hereinbefore, rotor tilt also causes spring foreshortening. Therefore, the joint 76 is bicentric to allow a lengthwise shift between the spring 72 and the spring 74 and prevent tension or buckling in the spring 70 due to foreshortening.

Referring to FIGS. 7 and 8, the joint 76 includes two outer cuff-like races 82 that attach to the outboard ends of the spring 72 and an outer cuff-like race 84 that attaches to the outboard end of the spring 74. The inner race of the joint 76 is a bicentric gudgeon pin 86 having an axis 92 associated with the races 82 and a second, offset axis 94 associated with the race 84. Therefore, as the spring 74 bends relative to the spring 72, it is free to shift longitudinally with respect thereto up to a maximum shift of twice the offset between the axes 92 and 94.

It is vogue to use elastomeric bearings in helicopter rotors rather than conventional lubricated bearings. Of the many advantages realized thereby is the ability of an elastomeric bearing to provide damping and a self-centering restoring moment. In the context of the joint 76, a layer of elastomer 88 is bonded in the clearance between the pin 86 and the races 82 and 84. This limits the freedom of the spring 74 to rotate but, as it turns out, it need not rotate much in response to rotor tilt. Since the pin 86 is bonded, via the elastomer 88, to the races 82 and 84, a "starting position" for the pin must be selected that corresponds to no rotation and no foreshortening of the spring 74. In this case, orienting the axis 94 either directly above or below the axis 92 will provide for appropriate foreshortening.

Locating the spring 70 in-plane with the tilt point (P) minimizes foreshortening (a radial translation) and also minimizes the azimuthal shift (a tangential translation) between the springs 72 and 74 due to rotor tilt, which is maximum at the tilt axis where there is the most twist.

The pin 86 is provided with annular shoulders 96 that, in conjunction with the elastomer 88 provide a thrust bearing surface between the race 82 and the races 84 so that torque is driven from the outward legs 72 to the inward legs 74. Also the pin 86 is provided with annular end shoulders 98 to insure interconnecting thrust between the inward and outward springs in conjunction with pin end bolts 99. The shoulders 96 and 98 and elastomer 88 also provide a small amount of edgewise damping between the blade and rotorshaft, which may be preloaded by the pin end bolts 99. Elastomer bulge strain is also reduced thereby.

Since the spring 70 carries torque, the disc 60 is not required and a simple fairing 100 can surround the hub. An exemplary fairing is described in U.S. Pat. No. 4,212,588 (Fradenburgh, 1980), entitled SIMPLIFIED ROTOR HEAD FAIRING.

In the case of either the spring 50 or the spring 70, the spring must be radial to the rotorshaft. As shown in FIG. 2, the blades are prelagged. In other words the pitch axis is offset ahead of a rotorshaft radial. Therefore, the spring is skewed with respect to the arms 31 so that the inward leg of the spring intersects the pitch axis at the point where it attaches to the hub member 28 to equalized the bending and twisting of the springs.

The invention has been described with respect to specific embodiments thereof. It should be understood that various modifications could be made therein and thereto without departing from the spirit and scope of the invention.

What is claimed is:

1. A helicopter rotor system for a helicopter having a rotorshaft (18), a hub member (28) that is freely tiltable about a point (P) on the rotorshaft axis, and blades (12) that are radially attached to the hub member (28) in a rotor plane that nominally intersects the rotorshaft axis at a point (Q), which is above the point (P), characterized by:

a plurality of long flat compound springs (70) for providing a hub moment, each compound spring having an outward spring (72) attached at its inboard end to the rotorshaft in-plane with the point (P), and an inward spring (74) attached at its inboard end to the hub member 28 in-plane with the point (P); and a joint for pivotally connecting the outboard ends of the outward and inward springs while allowing for foreshortening therebetween in a direction radial to the rotorshaft.

* * * * *